Oct. 18, 1949.  W. A. LEDWITH  2,484,952
TURBINE LUBRICATION MEANS
Filed Jan. 28, 1944  3 Sheets-Sheet 1

INVENTOR
Walter A. Ledwith
Charles A. Warren
ATTORNEY

Oct. 18, 1949.   W. A. LEDWITH   2,484,952
TURBINE LUBRICATION MEANS

Filed Jan. 28, 1944   3 Sheets-Sheet 3

INVENTOR
Walter A. Ledwith
Charles A. Warren
ATTORNEY

Patented Oct. 18, 1949

2,484,952

UNITED STATES PATENT OFFICE 2,484,952

TURBINE LUBRICATION MEANS

Walter A. Ledwith, Hartford, Conn., assignor to United Aircraft Corporation, East Hartford, Conn., a corporation of Delaware Application January 28, 1944, Serial No. 520,064

9 Claims. (Cl. 184—6)

This invention relates to a turbine particularly adapted for use in aircraft.

The co-pending application of Buck and Ledwith, Serial No. 520,065, filed January 28, 1944, now Patent No. 2,439,447, described a turbine having a rear bearing to which lubricant and coolant are pumped and from which lubricant and coolant are scavenged for reuse. In accordance with this invention which is, in certain respects, an improvement on the invention in the Buck and Ledwith application, a pressure is maintained on the scavenging system to assure operation of the pumps.

Aircraft power plants are subject to substantial changes in atmospheric pressure. When the turbine is operated at high altitudes the lubricant scavenge system, if vented to the surrounding atmosphere, might be at such a low pressure that the pumps could not function successfully. A feature of this invention is the maintaining of a predetermined pressure on the lubrication system independently of change in the surrounding pressure.

Other objects and advantages will be apparent from the specification and claims, and from the accompanying drawing which illustrates what is now considered to be a preferred embodiment of the invention.

Fig. 5 is a sectional view on a smaller scale than Fig. 1 through the turbine housing showing the vent passage.

Figure 1:
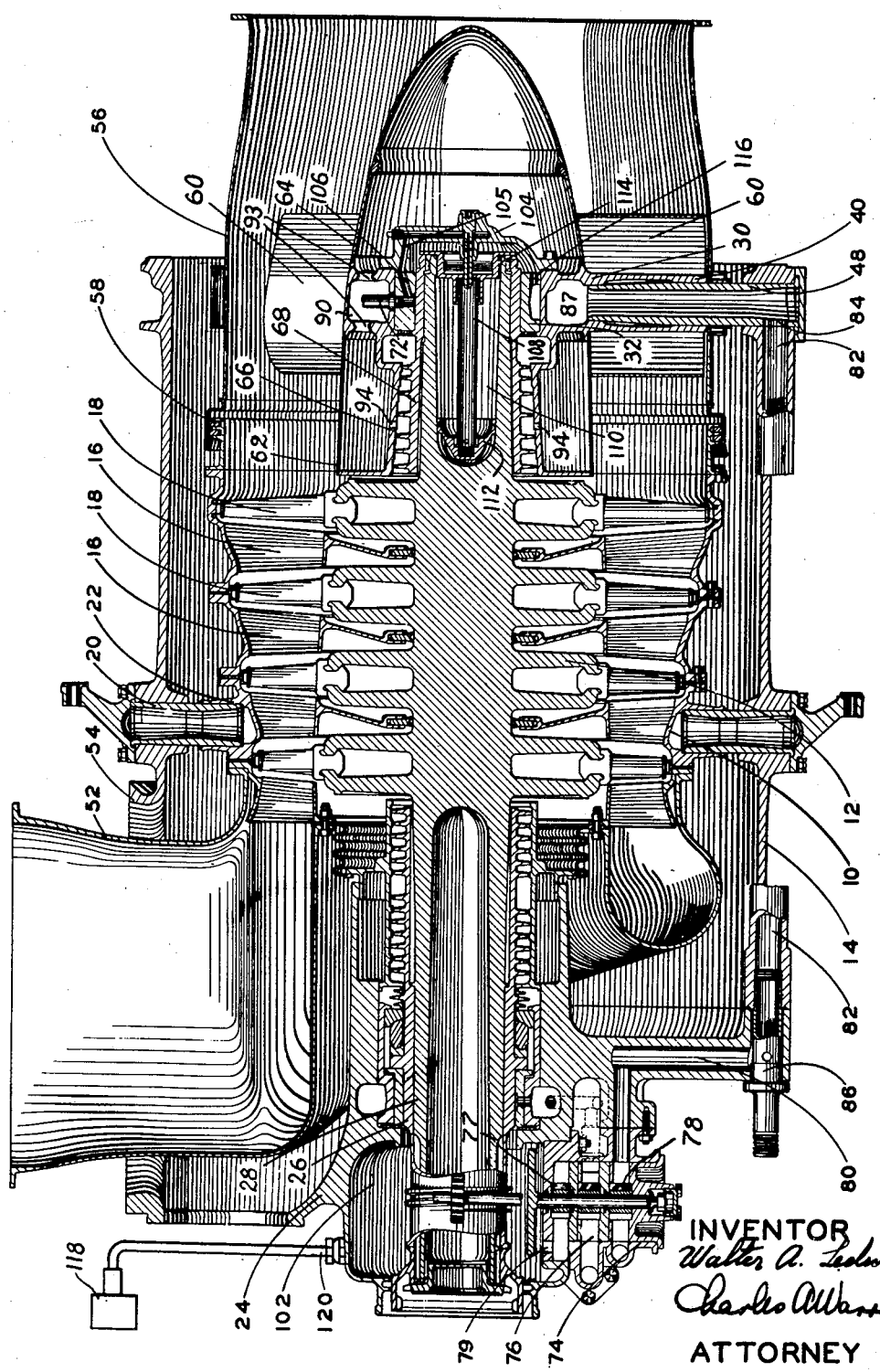
Fig. 1 is a sectional view through the turbine, the rear end bearing section being on the line 1—1 of Fig. 2.

The turbine shown has a casing 10 and a rotor 12, both supported by a housing 14. Casing 10 has several parallel rows of circumferentially spaced nozzle-forming vanes 16 which alternate with rows of blades 18 on the rotor. The part of the rotor having these blades and the part of the casing having the vanes constitute the power section of the turbine.

Casing 10 is supported by radial pins 20 in the housing and engaging bosses 22 in the casing. These pins are all in the same radial plane and constitute the sole support for the casing. The casing is free to expand axially within the housing and is smaller in diameter than the housing at its plane of support, thus permitting the casing to expand radially without destroying its concentric alignment. Clearance is provided at the inner ends of pins 20 for radial expansion of the casing.

Housing 14 has a head 24 which forms a part of the housing and supports a bearing 26 for the front end of the turbine shaft 28 integral with the rotor. At the other end of the rotor, housing 14 has a mounting 30 within which is a bearing 32 for the shaft. Mounting 30 has a number of legs 34, 36, 38, and 40 engaging radial supporting pins 42, 44, 46, and 48 mounted in the housing and held in position by caps 50.

Power gas is conducted into casing 10 by an intake scroll 52 connected to the casing 10 and extending through an opening 54 in the housing to connect with an inlet pipe not shown. The scroll is spaced from housing 14 and head 24 so that transfer of heat from the scroll to the housing is minimized. At the discharge end of the casing, power gas is discharged through a duct 56 which surrounds mounting 30. The inner end of the duct may engage resilient sealing rings 58 in grooves in casing 10 so that axial expansion of the casing does not affect the position of the duct.

The outer ends of the legs on mounting 30 engage with the duct and support the duct in concentric relation to the mounting. The supporting pins 42, 44, 46, and 48 extend through openings in the duct and hold the duct in axial position within the housing.

The path for power gas discharging from the turbine is within the duct and between the legs on the mounting. Each leg may have a surrounding shield 60 which is streamlined to minimize the resistance to the gas flow. These shields, in conjunction with shields 62 and 64 around the mounting, prevent overheating of the mounting by the power gas.

Figure 3:
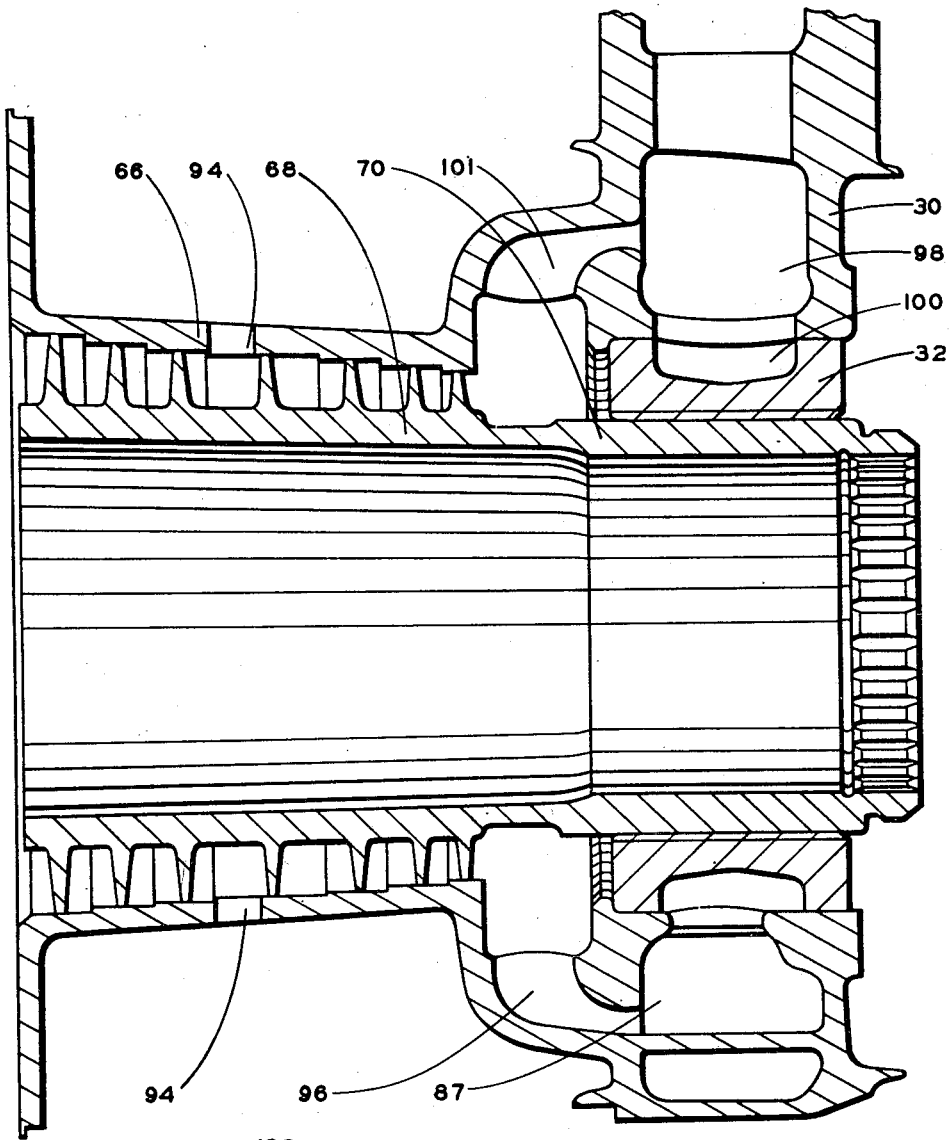
Fig. 3 is a sectional view on the line 3—3 of Fig. 2.

Mounting 30 carries the outer element 66, Fig. 3, of a labyrinth seal, the inner element 68 of which is mounted on and rotates with turbine shaft 28. Inner element 68 may be integral with a bearing sleeve 70 on the shaft which engages with bearing 32 in mounting 30. Gas under pressure is admitted to this seal between its ends for preventing leakage of power gas through the seal.

Figure 2:
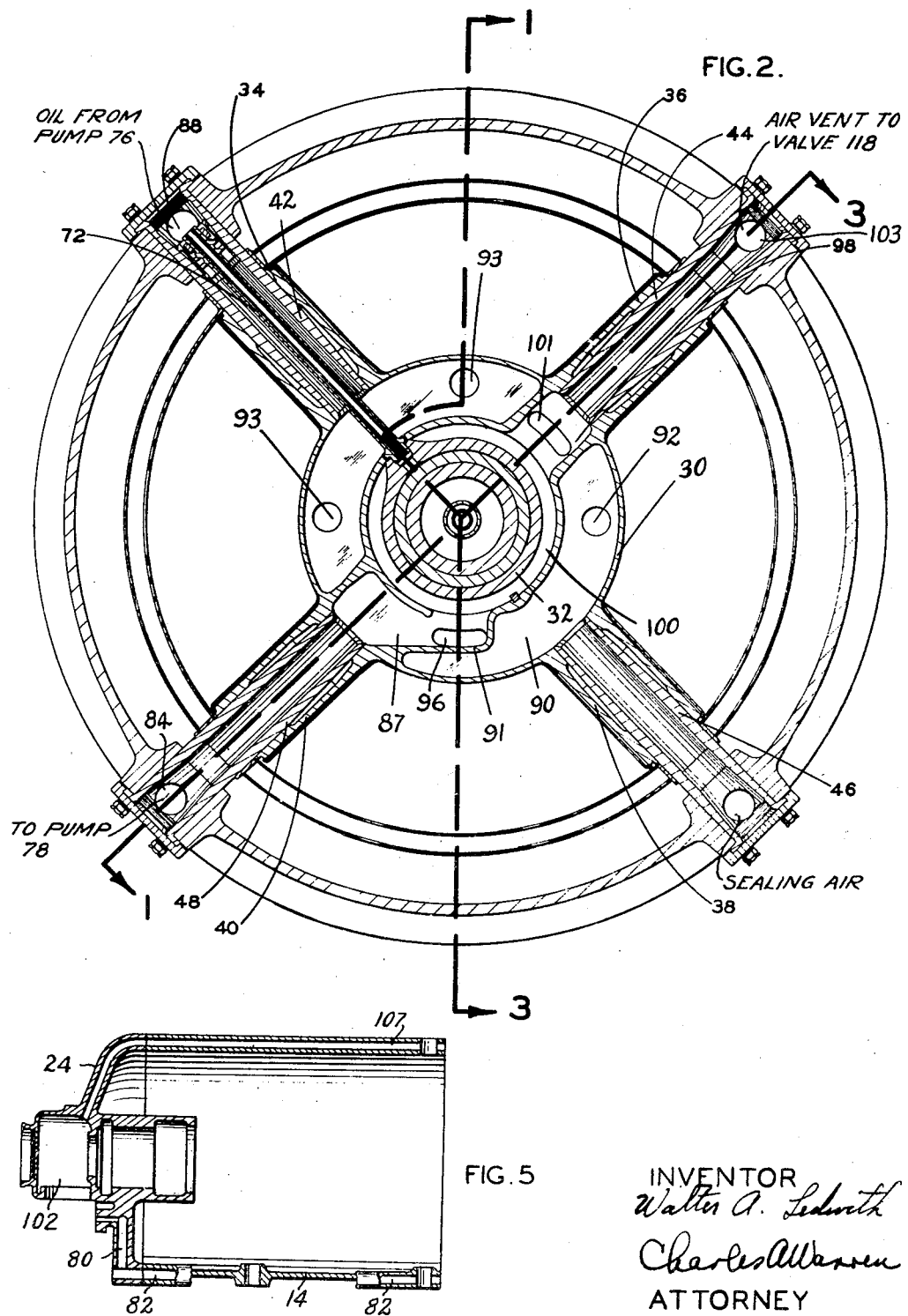
Fig. 2 is a sectional view through the rear bearing and its supporting structure.

Lubricant for bearing 32, coolant for the end of turbine shaft 28 and sealing air for the labyrinth seal are admitted to the mounting through the radial supporting pins which are made hollow to form passages for the fluids. As shown in Fig. 2, leg 34 of mounting 30 has an oil inlet pipe 72, the inner end of which is threaded in a boss in bearing 32.

To supply lubricant, head 24 has mounted thereon an oil pump casing 74, Fig. 1, having gear pumps 76 and 78 which may be driven directly from the turbine rotor.

Pump 78 which scavenges oil from mounting 30 is connected by a passage 80 in head 24 and passage 82 in housing 14 to the outer end of pin 48 which has a side opening 84 in line with passage 82. A transfer pin 86 connects passages 80 and 82. When pump 78 is operating, oil is thus pumped out of a recess 87 in mounting 30 in which the oil collects.

Lubricant from pump 76 which supplies oil to the bearing is directed through passages not shown similar to passages 80 and 82 in head 24 and housing 14. These passages connect with the outer end of pin 42 in which tube 72 is mounted. A radial opening 88 in this pin is in line with the oil passages in the housing.

Housing 14 may have a third passage similar to passages 80 and 82 through which sealing air for the labyrinth seal is admitted. This passage is connected by the hollow pin 46 which admits fluid to an annular chamber 90 surrounding bearing 32. This chamber is separated from recess 87 by a wall 91.

From chamber 90, sealing air passes through openings 92, Fig. 2, and 93, Figs. 1 and 2, into the space within shields 62, and 64, and through ports 94 in the outer element of the labyrinth seal. This air pressure is higher than the pressure within the turbine adjacent to the seal, and air working through the seal into the turbine prevents power gas from leaking through the seal.

As shown in Fig. 3, the space between bearing 32 and the end of the labyrinth seal is connected by a channel 96 to the chamber 87 at the inner end of pin 48 through which oil is scavenged.

The fourth radial supporting pin 44 connects at its inner end with a chamber 98 within the mounting. This chamber intersects a groove 100 in bearing 32 and thus vents chamber 87 at the inner end of scavenge pin 48. A passage 101 in mounting 30 connects with the space between the seal and the bearing for venting this space.

Pin 44 at its outer end has a lateral opening 103 which connects with another passage 107, Fig. 5, in housing 14 and head 24 similar to passages 82 and 80. This passage enters a chamber 102 in head 24 which surrounds the rotor shaft and into which oil from the front bearing 24 drains. This chamber may be scavenged by a pump 77, similar to pump 78, which is connected by a passage 79 with chamber 102.

In addition to lubricating the bearing, and supplying air to the seal, fluid is also circulated through the end of the turbine shaft for cooling. Mounting 30 has a cap 104 having a passage 105 connecting with a cross-channel 106 in bearing 32 through which a part of the lubricant delivered to the bearing may be supplied to a tube 108 extending into a recess 110 in the end of the shaft. This tube delivers the oil which functions as a coolant to the inner end of the recess where it is discharged over a baffle 112 to flow along the sides of the recess and escape through grooves 114 in the end of the shaft to the inside of the cap. One or more channels 116 in bearing 32 connect the space within the cap to chamber 100 which, as shown in Fig. 2, is connected with scavenge chamber 87.

Figure 4:
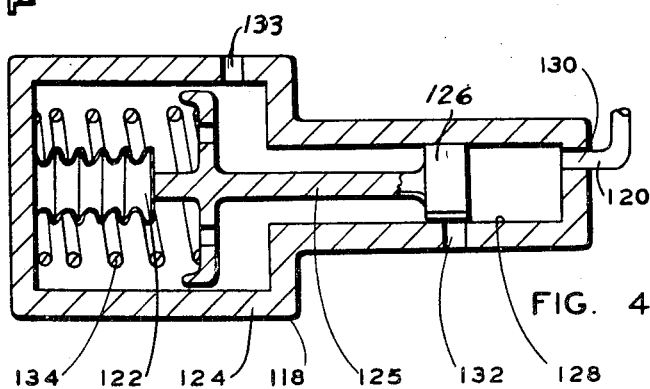
Fig. 4 is a sectional view of the valve for controlling the scavenge pressure.

Chamber 102 may be vented through a valve 118, Fig. 4, which will permit maintaining a pressure in the chamber regardless of the altitude at which the turbine is operated. As shown, valve 118 is connected by a conduit 120 to the chamber and controls the amount of gas escaping from the chamber.

As shown in Fig. 4, a sealed evacuated bellows 122 in a housing 124 is connected by a stem 125 to a plunger 126 sliding in a bore 128. Conduit 120 is connected to a port 130 in the bore, and a discharge port 132 in the bore is in a position to be more or less closed by the plunger. Plunger 126 maintains a constant pressure at the end of bore 128 independently of changes in atmospheric pressure by making the area of this plunger the same as the area of the bellows Housing 124 is open to atmosphere by a port 133.

Plunger 126 is moved into a position to close port 132 by a spring 134. By proper selection of the areas of the bellows and of the plunger and the size of spring 134, it will be possible to obtain the desired pressure on the right hand end of the plunger, this pressure being the pressure which will exist in chamber 102.

As atmospheric pressure decreases, for example, the pressure acting externally on the sealed bellows 122 decreases but is balanced by the same atmospheric pressure on the left hand end of plunger 126, the effect of the bellows and plunger being equal.

Since changes in atmospheric pressure do not affect the position of the plunger, its position is controlled entirely by the spring 134 and the balancing pressure within chamber 102, this balancing pressure acting on the right hand end of the plunger.

Since chamber 102 is connected to chamber 87 as described above, the same pressure prevails in both chambers and this pressure will be high enough to assure operation of the scavenge pumps for the fluids collecting in these chambers. The sealing air working through the labyrinth seals will provide a continuous supply of air for maintaining the desired pressure in the chambers, since this air will necessarily be at a higher pressure than that maintained in the chambers.

It is to be understood that the invention is not limited to the specific embodiments herein illustrated and described, but may be used in other ways without departure from its spirit as defined by the following claims.

I claim:

1. A turbine having a rotor, a bearing for the rotor, a housing for the bearing having a scavenge chamber adjacent the bearing to collect oil from the bearing and means for pumping oil from said chamber, in combination with means for maintaining pressure in said chamber, said last means including means for supplying gas under pressure to said chamber, a vent for said chamber and a control valve on said vent for maintaining the desired pressure.

2. A turbine construction including a housing having a bearing at one end, at least one row of nozzles supported within the housing, a rotor within the casing having blades cooperating with the nozzles, said rotor being supported at one end by said bearing, a bearing for the other end of the rotor, a mounting for said last mentioned bearing, pins engaging said housing and mounting for supporting the latter within the housing, said mounting being spaced from the housing to define a path for power fluid around the mounting, means for supplying lubricant to the bearings, one of said pins being hollow for the flow of lubricant through it a chamber adjacent each bearing to collect lubricant from the bearings, means for scavenging lubricant from said chambers including a passage in one of said pins through which the lubricant flows, and means for maintaining a predetermined pressure of gas in said chambers independently of atmospheric pressure, said last means including a fluid connection between said chambers, and a valve for controlling the pressure in one of said chambers.

3. A turbine construction including a housing having a bearing at one end, at least one row of nozzles supported within the housing, a rotor within the casing having blades cooperating with the nozzles, said rotor being supported at one end by said bearing, a bearing for the other end of the rotor, a mounting for said last mentioned bearing, pins engaging said housing and mounting for supporting the latter within the housing, said mounting being spaced from the housing to define a path for power fluid around the mounting, means for supplying lubricant to the bearings, one of said pins being hollow for the flow of lubricant through it, a chamber adjacent each bearing to collect lubricant from the bearings, means for scavenging lubricant from said chambers including a passage in one of said pins through which the lubricant flows, and means for maintaining a predetermined pressure of gas in said chambers independently of atmospheric pressure, said last means including means for admitting gas under pressure to at least one of said chambers, fluid connection between said chambers, a vent for one of said chambers, and a valve on said vent for controlling the pressure within said chamber.

4. A turbine construction including a housing having a bearing at one end, at least one row of nozzles supported within the housing, a rotor within the casing having blades cooperating with the nozzles, said rotor being supported at one end by said bearing, a bearing for the other end of the rotor, a mounting for said last mentioned bearing, pins engaging said housing and mounting for supporting the latter within the housing, said mounting being spaced from the housing to define a path for power fluid around the mounting, means for supplying lubricant to the bearings, one of said pins being hollow for the flow of lubricant through it, a chamber adjacent each bearing to collect lubricant from the bearings, means for scavenging lubricant from said chambers including a passage in one of said pins through which the lubricant flows, and means for maintaining a predetermined pressure of gas in said chambers independently of atmospheric pressure, said last means including means for admitting gas under pressure to at least one of said chambers, a vent for one of said chambers, a valve for controlling the gas pressure in one of said chambers, and a fluid connection between said chambers, said fluid connection including a passage formed in the housing.

5. A turbine construction including a housing having a bearing at one end, at least one row of nozzles supported within the housing, a rotor within the casing having blades cooperating with the nozzles, said rotor being supported at one end by said bearing, a bearing for the other end of the rotor, a mounting for said last mentioned bearing, pins engaging said housing and mounting for supporting the latter within the housing, said mounting being spaced from the housing to define a path for power fluid around the mounting, a group of pumps adjacent one of the bearings for supplying lubricant to the bearings and for scavenging lubricant from the bearings certain of said pins being hollow for the flow of lubricant through them, a chamber adjacent each bearing in which lubricant is collected and from which the lubricant is scavenged, means including passages in the housing for connecting the pumps with the bearing and chamber in said mounting, and means for maintaining a predetermined pressure of gas in said chambers including a passage in said housing providing a fluid connection between said chambers, and pressure actuated valve means connected with the chamber adjacent the first mentioned bearing for controlling the supply of gas in and thereby maintaining a predetermined pressure in said chamber and thereby controlling the pressure in both chambers by means of said interconnecting passage.

6. A turbine construction including a rotor, spaced bearings for said rotor, housings in which said bearings are mounted, said housings having chambers adjacent to the bearings to collect oil from the bearings, and means for maintaining a predetermined pressure in each of said chambers independently of atmospheric pressure changes, including a connection between said chambers, means for separately scavenging each chamber and pressure responsive valve means for controlling the pressure in said chambers.

7. A turbine for aircraft including a housing, a rotor within the housing, spaced bearings for the rotor supported by the housing, chambers adjacent the bearings to collect oil from the bearings, pumps for supplying oil to the bearings and for scavenging oil from the chambers, means for supplying gas under pressure to said chambers, and pressure actuated valve means for venting said chambers and thereby maintaining a predetermined pressure in the chambers independently of changes in atmospheric pressure.

8. A turbine for aircraft including a housing, a rotor within the housing, a bearing for said rotor, a mounting within the housing, said mounting having projecting legs between which the power fluid passes, pins engaging said legs and said housing to hold the mounting in position, means for supplying oil to the bearing, a chamber in the mounting adjacent the bearing in which oil from the bearing collects, means for pumping oil from said chamber through one of said legs, pressure actuated valve means for venting said chamber and thereby maintaining a predetermined pressure in said chamber, and means for admitting gas through one of said legs to said chamber.

9. A turbine for aircraft including a housing, a rotor within the housing, a bearing for said rotor, a mounting for said bearing, said mounting having projecting legs between which the power fluid passes, pins engaging said legs and said housing to hold the mounting in position, a chamber in the mounting, adjacent the bearing, and means for supplying oil to said bearing through one of said legs, in combination with means for removing oil from said chamber, means including a pressure actuated valve for controlling the pressure in and thereby maintaining a selected pressure in said chamber independent of the surrounding atmospheric pressure and means for admitting gas through one of said legs to said chamber.

WALTER A. LEDWITH.

(References on following page)

REFERENCES CITED

The following references are of record in the file of this patent:

UNITED STATES PATENTS

| Number | Name | Date |
|---|---|---|
| 2,223,847 | Engdahl | Dec. 3, 1940 |
| 2,234,777 | Puffer | Mar. 11, 1941 |
| 2,302,822 | Warner | Nov. 24, 1942 |
| 2,312,063 | Allen | Feb. 23, 1943 |
| 2,439,447 | Buck et al. | Apr. 13, 1948 |

FOREIGN PATENTS

| Number | Country | Date |
|---|---|---|
| 37,252 | France | July 22, 1930 |
|  | (Addition to No. 653,604) | |
| 117,614 | Britain | Jan. 9, 1919 |
| 693,129 | Germany | July 3, 1940 |